Aug. 13, 1968   A. W. FRENCH   3,396,592
DRIVE APPARATUS
Filed Sept. 26, 1966   2 Sheets-Sheet 1
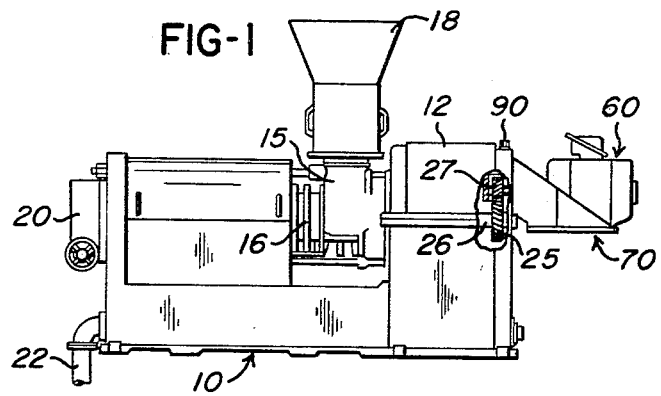
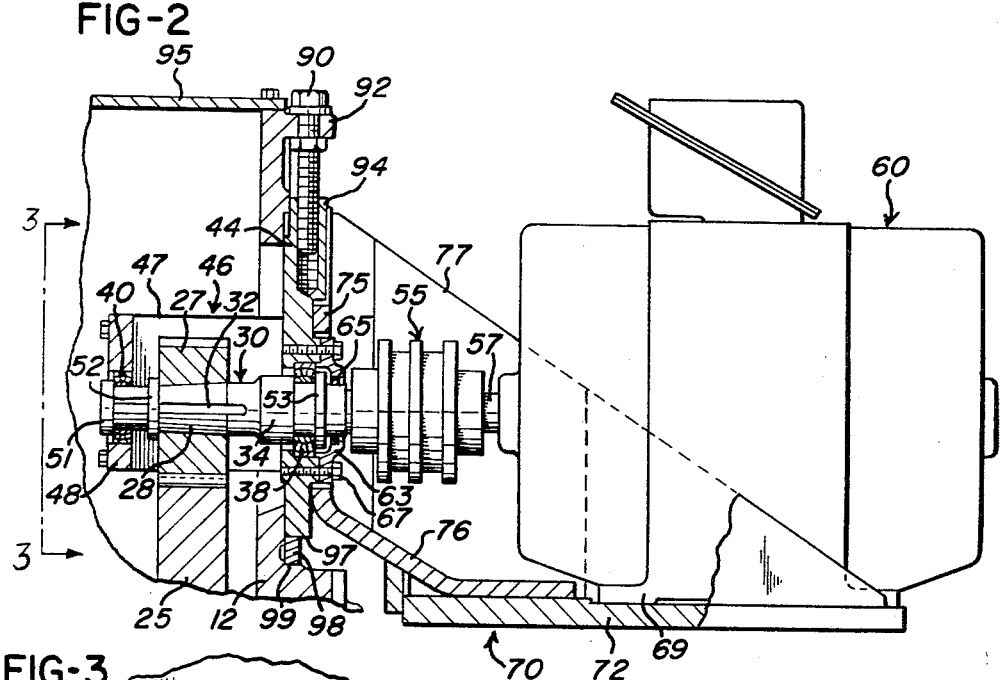
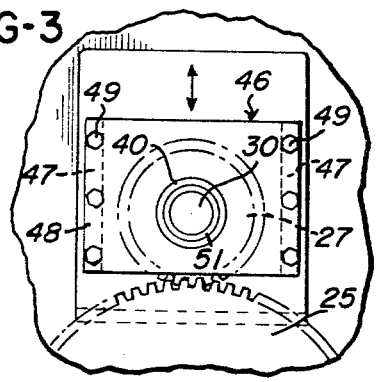
*INVENTOR.*
ALFRED W. FRENCH
BY *Maréchal, Biebel, French & Bugg*
ATTORNEYS Aug. 13, 1968  A. W. FRENCH  3,396,592
DRIVE APPARATUS
Filed Sept. 26, 1966  2 Sheets-Sheet 2
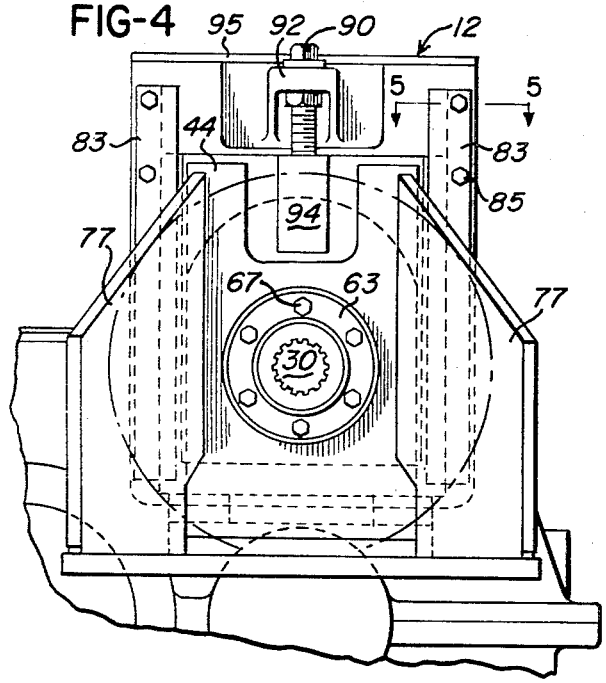
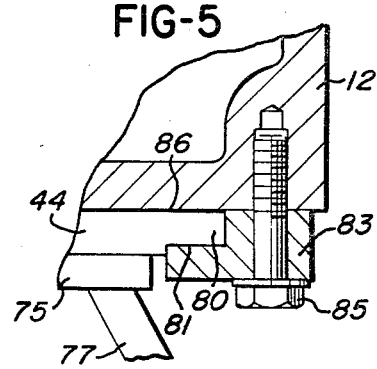
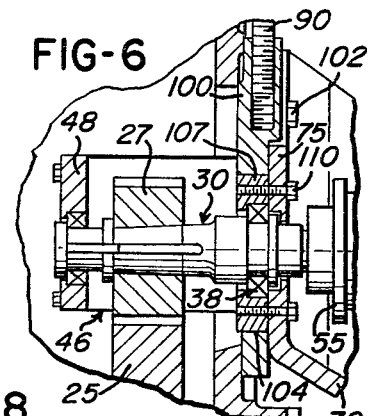
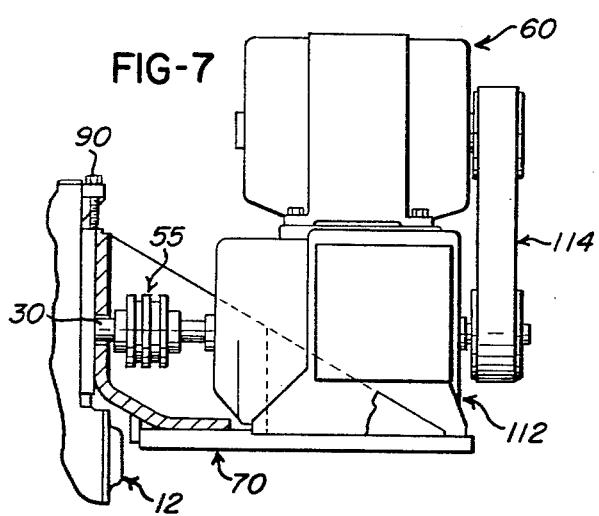
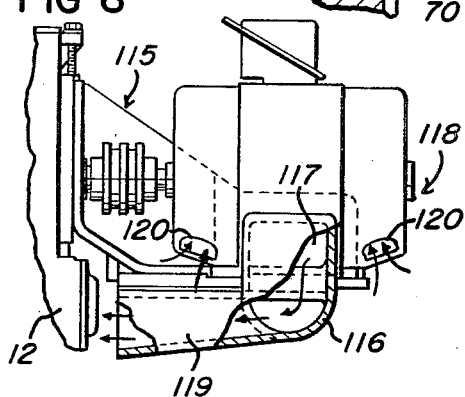
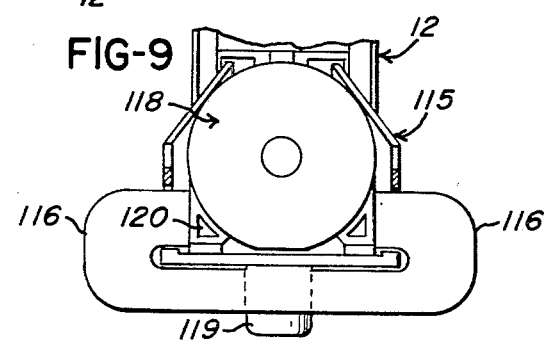

United States Patent Office 3,396,592
Patented Aug. 13, 1968

1

3,396,592
DRIVE APPARATUS
Alfred W. French, Piqua, Ohio, assignor to The French
Oil Mill Machinery Company, Piqua, Ohio, a corporation of Ohio
Filed Sept. 26, 1966, Ser. No. 582,149
8 Claims. (Cl. 74—325)

This invention relates to an improved drive apparatus, and more particularly, to improvements in the mechanical drive shown in U.S. Patent No. 2,766,636, issued to the assignee of the present invention.

Primarily, the invention is directed to a drive apparatus for machines which commonly run at one selected speed, but which apparatus may be easily changed to provide the machine with another speed for another operation. A typical such machine is a mechanical screw press where it is frequently desirable to change the speed of the rotating screw in accordance with the material being processed therein for obtaining the optimum performance of the press.

The present invention is also directed to a drive apparatus wherein a commercially available power supply unit can be employed, as for example, a motor having a standard frame and drive shaft, thereby providing for convenient interchangeability of power supply units to minimize downtime during servicing as well as providing a greater selection of types of power supply units. Furthermore, it has been found desirable to provide a drive apparatus wherein helical reduction gears can be used without transferring axial thrust to the drive shaft of the power supply unit. This permits the use of gears of less costly construction than, for example, herringbone gears.

Accordingly, it is a primary object of the present invention to provide an improved drive apparatus, adapted for use on a screw press, wherein power can be supplied by a power unit of standard construction which is adjustably supported for connection with pinions of varied sizes, and wherein the power unit is adapted for rapid and convenient replacement to minimize the time required for servicing.

It is also an object of the present invention to provide an improved drive apparatus as outlined above wherein the drive pinion can be easily replaced with a different size pinion, and the pinion shaft is adapted to be conveniently positioned according to the size of the drive pinion.

As another object, the invention provides an improved drive apparatus as outlined above wherein the drive motor or other power supply unit is adapted to be easily removed for servicing or replacement without disturbing the engagement between the drive pinion and the driven gear.

A further object of the invention is to provide an improved adjustable drive apparatus as outlined above wherein a helical driven gear and drive pinion may be employed and the resulting axial thrust developed by the helical drive pinion is not transferred to any bearing within the motor or other power supply unit.

Still another object of the invention is to provide a drive apparatus as outlined above, wherein duct means are provided on the motor support bracket for directing the cooling air which is forced through the drive motor also over the housing enclosing the gear reduction unit to provide for cooling of the unit.

A further object of the invention is to provide an improved drive apparatus for a mechanical screw press, as outlined above, wherein a magnetic coupling may be used between the power supply unit and the drive pinion while providing for convenient interchangeability of drive pinions.

Other objects and advantages of the invention will be apparent from the following description, the accompanying drawings and the appended claims.

In the drawings—

FIG. 1 is an elevational view of a typical mechanical screw press having a drive apparatus formed in accordance with the present invention;

FIG. 2 is an elevational view in part axial section of the drive apparatus in accordance with the invention and showing the assembled relationship of the major components;

FIG. 3 is a view of the inboard bearing support bracket as taken generally along the line 3—3 of FIG. 2;

FIG. 4 is an end elevational view of the motor support bracket shown slidably retained by the gear box housing;

FIG. 5 is a fragmentary section view along line 5—5 og FIG. 4 showing the slidable mounting of the motor support bracket;

FIG. 6 is a fragmentary section of a drive apparatus and showing a modification of the invention;

FIG. 7 is an elevational view of another modified drive apparatus including a magnetic coupling driven by a motor, both of which are adjustably carried by the support bracket;

FIG. 8 is an elevational view of a modified support bracket which is provided with a duct for directing the forced air which cools the motor over the exterior surface of the gear box housing for cooling of the gear reduction unit; and FIG. 9 is an end elevational view of the modified bracket shown in FIG. 8.

Referring to the drawings which illustrate preferred embodiments of the present invention, FIG. 1 shows a typical mechanical screw press which includes generally a base supporting frame 10 which connects with the gear box housing 12 enclosing a gear reduction unit for driving the main feed and compression screws which extend horizontally through a feed housing 15 and cage 16. The material to be processed is fed into the inlet hopper 18, through the feed housing 15, cage 16 and out through the discharge end 20. When liquid is expressed from the material, the liquid is drained through the line 22 for disposal as desired.

Within the housing 12 is a gear reduction train for driving the main compaction or compression screw at a relatively low speed. Included in the gear train is a driven gear 25 which is mounted on the driven shaft 26 rotatably supported within the housing 12. As shown, the driven gear 25 is a helical gear and is rotated by the helical drive pinion 27 which is positively mounted on a tapered portion 28 of a stub shaft 30 provided with a key 32. The stub shaft 30 is provided with a portion 34 of greater diameter which provides a shoulder for spacing the inner race of the outboard roller bearing 38. The portion of the stub shaft 30 extending from the opposite side of the drive pinion 27 is rotatably supported by an inboard roller bearing 40.

A main support member or plate 44 retains the outboard bearing 38 and serves to carry an inwardly extending yoke member 46 having side plates 47 which are welded to the support plate 44 to form a rigid extension thereof. The inboard end surface of the side plates 47 serve to support the end plate 48 which retains the bearing 40 and is removably connected by means of a series of uniformly spaced screws 49. Thus, it can be seen that the drive pinion 27 is carried by the main support plate 44 and is rotatably mounted by means of the stub shaft 30 extending through the bearings 38 and 40 spaced on opposite sides of the drive pinion 27. The retaining rollers 51, 52, and 53 are provided to secure the bearings 38 and 40 and pinion 27 in spaced relationship on the stub shaft 30.

As shown in FIG. 2, the outboard end portion of the stub shaft 30 which extends through the support plate 44 is connected by a coupling 55 to the power output shaft 57 which projects horizontally from the electric motor 60. To provide for access and for convenient removal of the bearing 38, an annular cover plate 63 retaining a shaft seal 65, is provided and is secured to the support plate 44 by means of the screws 67 (FIG. 4).

The horizontal positioned motor 60 is supported on its standard mounting base 69 by a support bracket 70 having a horizontal portion 72 and a vertical portion 75 which is rigidly attached to the support member or plate 44 by welding or screws so as to be carried by the plate 44 in the same manner as the yoke member 46 mounted on the opposite side of the plate 44. Preferably, the horizontal portion 72 is rigidly connected to the vertical portion 75 by an extension 76 of the vertical portion 75 and the side brace plates 77.

As shown in FIG. 5, each side edge portion 80 of the support plate 44 is slidably supported within a guide way 81 provided by an L-shaped clamping track 83 which is mounted on the housing 12 by the screws 85. The tracks 83 are constructed so that when the screws 85 are tightened, the supporting plate 44 is held firmly against the outer surface or face 86 of the housing 12. However, when the screws 85 are loosened slightly, the plate 44 is adapted to slide vertically within the guide tracks 83 carrying with it the assembly of the motor 60, coupling 55, stub shaft 30 and a drive pinion 27. To provide for convenient vertical movement of this assembly, a jack screw 90 (FIG. 4) extends through the boss 92 formed on the housing 12 and is threadedly engaged into an opening formed within a boss 94 extending as part of the support plate 44.

To replace the drive pinion 27 with another pinion of a different size, the motor drive apparatus or assembly is raised by means of the jack screw 90 and the end plate 48 is removed through an access opening formed in the top of the housing 12 and covered by the plate 95. When the retaining collars 51 and 52 are removed, the beveled drive pinion 27 can be removed from the tapered portion 28 of the stub shaft 30 by tapping the back side of the pinion or with a suitable gear puller. After a different size drive pinion 27 is mounted on the stub shaft 30, the assembly is lowered by means of the jack screw 90 until the bottom end 97 (FIG. 2) of the plate 44 engages the top surface of the spacing block 98 which rests upon a flat surface 99 formed on the housing 12 and which corresponds to the size of the drive pinion 27. Thus, if a larger drive pinion is desired, a higher spacing block 98 is employed so that the engagement between the helical teeth on the drive pinion 27 and the teeth on the driven gear 25 is maintained according to a predetermined spaced relationship.

The roller bearing 38 is adapted to carry the axial thrust produced by the helical drive pinion 27 and thus, the thrust is not transferred through the coupling 55 to the motor shaft 57. Preferably, the coupling 55 is of the flexible type which eliminates the requirement for precise alignment between the stub shaft 30 rotatably mounted within the bearings 38 and 40 and the motor shaft 57.

According to another embodiment of the invention as shown in FIG. 6, the major portion of the drive apparatus is adapted to be removed as a subassembly from the housing 12 by removing a series of screws 102 which hold the support bracket 70 firmly against the support plate 100. This enables the stub shaft 30 and drive pinion 27 to be pulled through an opening 104 formed in the plate 100, which is slightly larger than the diameter of the largest drive pinion 27. To provide this feature, the bearing 38 is supported within a retaining ring 107 which is secured to the vertical portion 75 of the support bracket 70 by the bearing 38. The ring 107 also serves to locate with precision the support bracket 70 in relation to the plate 100.

Another feature of the drive apparatus according to the invention is shown by the apparatus in FIG. 7. In this arrangement, the support bracket 70 serves to support a power supply unit including an eddy current magnetic coupling 112 which is driven through a belt drive 114 by the motor 60 mounted on top of the coupling 112. Thus, by selecting the proper drive pinion of a predetermined size, the eddy current coupling can be operated within its most efficient range. Similarly, other types of power supply units, as for example, a steam turbine (not shown) could be mounted on the support bracket 70 and be operated within its most efficient range by proper size selection of the drive pinion 27. Thus, it can be seen that the improved drive apparatus of the invention provides versatility in selection of power drive units and enables them to be operated within their most efficient range by selecting the proper size drive pinion.

As shown in FIGS. 8 and 9, the modified support bracket 115 is provided with a pair of exhaust ducts 116 which connect with exhaust openings 117 spaced on opposite sides of the motor 118. These ducts serve to direct the cooling air exhausted from the motor into the central discharge duct 119. In this manner, cooling air is pulled in through the inlet ports 120 formed within the end bells of the motor 118 by a suitable cooling fan within the motor and is discharged through the central duct 119 in a direction to flow over the housing which encloses the gear reduction unit. Thus, air which is employed for cooling the motor 60 is also employed for cooling the gear reduction unit by passing the air over the exterior surface of the housing 12.

From the drawings and the above description, it can be seen that the present invention provides an improved drive apparatus offering a number of advantages and features. For example, the improved drive apparatus of the invention permits the use of an electric motor having a standard base or other power supply units depending on which may be operated most economically. This has been found to reduce substantially the downtime during servicing of the power supply unit since another more readily available power supply unit can be quickly substituted. Then too, by enabling the selection of different size drive pinions, the power supply unit can be operated within its most efficient speed range.

Furthermore, by rotatably mounting the stub shaft 30 within the bearings 38 and 40 which are carried by the slidable plate 44, not only can the assembly be raised as a unit for convenient exchanging of drive pinions, but the end thrust which may be produced by the drive pinion is not transferred to the output shaft of the power supply unit. Thus, it is not necessary to employ a power supply unit having special thrust bearings. In addition, by opposing the end thrust with the support plate 44, the drive pinion 27 and gear 25 may be formed with helical teeth which are more economical to form than the herringbone teeth which are commonly used to eliminate axial thrust. However, while a helical pinion and gear is preferred within the drive apparatus of the invention, it is to be understood that a more costly herringbone drive pinion and driven gear could be used, if desired.

As another feature provided by the embodiment shown in FIG. 6, the removable bearing retaining ring 107 enables the power supply unit, coupling 55, stub shaft 30 and pinion 27 to be mounted or removed as a subassembly, which is desirable in some installations where access through the cover plate 95 is not convenient.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. An improved drive apparatus for use on a gear reduction unit enclosed within a housing, comprising guide means connected to said housing including a slidably supported and vertically extending slide member, a support bracket connected to said slide member for move- ment therewith and including a horizontally extending portion, a power supply unit mounted on said horizontal portion of said support bracket and having a horizontally extending output shaft, a stub shaft extending into said housing, bearing means connected to said slide member for rotatably supporting said stub shaft in general alignment with said output shaft, coupling means connecting said stub shaft to said output shaft to provide a positive drive connection therebetween, a drive pinion mounted on said stub shaft and adapted to mesh with a driven gear rotatably mounted within said housing, and means for adjustably positioning said slide member in relation to said housing for disengaging said pinion and said gear to provide for interchanging drive pinions of different sizes according to the desired ratio of rotation between said pinion and said driven gear.

2. Drive apparatus as defined in claim 1 wherein said power supply unit includes an eddy current coupling driven by an electric motor, and said drive pinion having a pitch diameter selected to provide operation of said eddy current coupling within its most efficient range while rotating said driven gear at the predetermined speed required.

3. Drive apparatus as defined in claim 1 wherein said drive pinion and said driven gear have helical teeth, said bearing means including a bearing disposed on each side of said drive pinion, and at least one of said bearings adapted to carry axial thrust produced by said drive pinion.

4. Drive apparatus as defined in claim 3 wherein said slide member comprises a support plate including means defining an opening therein, said stub shaft extending through said opening and including a tapered portion, said drive pinion being mounted on said tapered portion, and said coupling means being a flexible coupling connecting said stub shaft to said output shaft.

5. Drive apparatus as defined in claim 4 wherein said opening within said support plate is slightly greater than the diameter of said drive pinion to provide for removing said pinion from the housing without removing said pinion from said stub shaft, and including means surrounding said stub shaft for covering said opening.

6. Drive apparatus as defined in claim 4 wherein one of said bearings is mounted within said opening within said support plate, and bracket means removably connected to said support plate for retaining the other said bearing on the opposite side of said pinion.

7. Drive apparatus as defined in claim 4 wherein said means for adjustably positioning said support plate includes a screw jack mounted on said housing and connected to said support plate, and spacer means disposed between said support plate and said housing to position said plate in relation to said housing.

8. Drive apparatus as defined in claim 1 including duct means mounted on said support bracket for directing cooling air from said motor over said housing for providing cooling of the gear reduction unit.

References Cited

UNITED STATES PATENTS

| | | | |
|---|---|---|---|
| 2,596,794 | 5/1952 | Schmitter | 74—421 |
| 2,600,043 | 6/1952 | Armitage et al. | 74—325 |
| 2,714,824 | 8/1955 | Schmitter | 74—421 |
| 2,766,636 | 10/1956 | French | 74—325 |
| 2,775,093 | 1/1957 | Reed | 74—325 |

FRED C. MATTERN, Jr., *Primary Examiner.*

H. S. LAYTON, *Assistant Examiner.*